Figure 1:
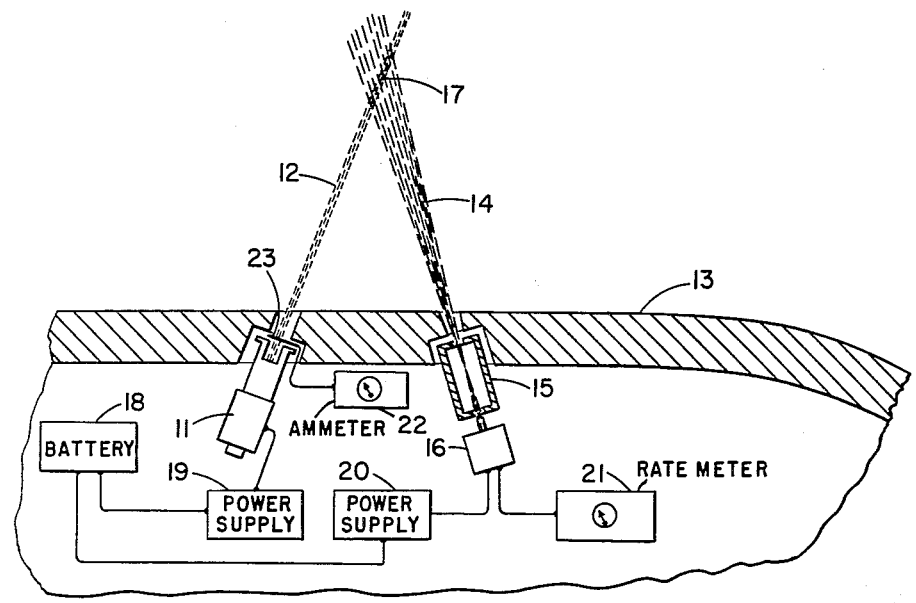
Figure 2:
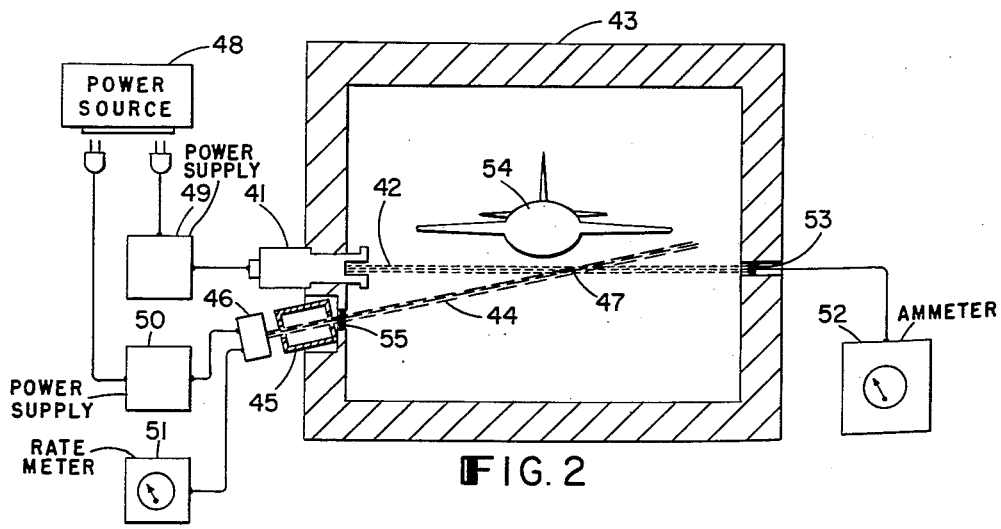

INVENTOR.
CHARLES A. ZIEGLER

United States Patent Office 3,154,681
Patented Oct. 27, 1964

3,154,681
APPARATUS FOR MEASURING LOCAL GAS DENSITIES IN A RAREFIED GASEOUS MEDIUM
Charles A. Ziegler, 23 Prior Drive, Framingham, Mass.
Filed Nov. 15, 1961, Ser. No. 152,509
7 Claims. (Cl. 250—43.5)

The Government of the United States of America has a non-exclusive, irrevocable non-transferable, royalty-free license to practice, and cause to be practiced for the Government, throughout the world, in the manufacture, use and disposition according to law of any article or material, and in the use of any method, the invention disclosed herein.

This invention relates to a method and apparatus for measuring gas density in a rarefied gaseous medium. In particular, it relates to a method and apparatus for measuring the density of a selected volume of gas situated in such medium remote from the measuring apparatus.

The advent of high altitude rockets and aircraft has provided the means for carrying instruments for the measurement of atmospheric density into the outer reaches of the earth's atmosphere, that is, above 75 kilometers in altitude. There are serious errors inherent in conventional devices for determining atmospheric density in the altitude region indicated. Indirect methods employing several diaphragm pressure sensors positioned on a rocket have been used in conjunction with aerodynamic theory to obtain atmospheric density. These methods, however, require accurate knowledge of rocket velocity and aspect and errors in these values are compounded in the derived density value. Ionization gauges can be used to measure atmospheric density at altitudes above 100 kilometers as well as methods based on voltage breakdown, glow discharge, thermal conductivity and hypsometry. However, all these methods are inaccurate since the measured air is in, or very near, the measuring apparatus and thus not necessarily representative of atmospheric air.

Other techniques using microwaves, ultraviolet light and electron beams can in theory sample air at some distance away from the rocket thus avoiding air that has been perturbed both by the passage of the rocket and outgassing from the surface of the rocket. None of these methods, however, have as yet been employed in a rocket sonde because of various faults. Thus, the size, weight and power requirements of the microwave apparatus are too large to allow its use in sounding rockets. Methods based on ultraviolet light scattering are subject to serious interference from environmental background except for night-time use and also, are subject to a large uncertainty due to atmospheric dust particles. Four techniques using an electron beam as a probe for measuring gas density have been described in this prior art (see B. W. Schumacher, Nucleonics, vol. 18, No. 10, page 106). These techniques are: electron attenuation, electron signal-scatter, electron-induced gas fluorescence and electron back-scatter. Of these, the first two require a geometric positioning of the electron source and detector that precludes their convenient use in a rocket, since the in-line arrangement of source and detector necessitates an aerodynamically undesirable structural support for at least one of these components extending out from the body of the rocket. The electron induced gas fluorescence method, (also described in Schumacher at el., U.S. Patent 2,952,776), is only suitable for night-time rocket use because of the high incidence of interfering radiation from the day-time environmental background. The electron back-scatter method is operable at high altitudes but for electron scattering angles greater than 100° (necessary for convenient rocket use) requires substantially more power than the method and apparatus which is the subject of this invention.

This invention also has application in any other field where it is sought to determine the local density of a rarefied gas such as the flow pattern around objects in a low pressure wind tunnel. Conventional means of measuring local densities near a wind tunnel model such as interferometry, and light refraction fail if the gas density is appreciably less than atmospheric which is the case when tests at simulated high altitude are made. Techniques based on X-rays, ultraviolet and electron attenuation have been used with but limited success since such methods give integral density values over the path length. The method described in U.S. Patent 2,952,776 and in a technical publication by B. W. Schumacher and E. O. Gadamer (Canadian Journal of Physics, vol. 36, page 659) using electron-induced gas fluorescence is capable of obtaining local, or differential, densities. However, if response times sufficiently fast to observe transient phenomena such as shock waves and the like are required, elaborate means for separating spectroscopically, or otherwise, the long-lived afterglow are necessary. Also there is a halo surrounding the electron beam which limits spatial resolution.

It is therefore an important object of this invention to provide a simple method and apparatus for determining local densities in a rarefied gaseous medium (pressure less than $10^{-3}$ mm. of mercury) with a high degree of spatial resolution and fast response time.

It is another important object of this invention to provide a method and apparatus that can be conveniently mounted in a rocket and used to measure atmospheric density at high altitudes, by sampling air located sufficiently far from the rocket to be truly representative of atmospheric density and thus free from perturbations due to the motion of the air around the rocket and to outgassing from the rocket surface.

It is a further object of this invention to provide a method and apparatus that is compact, low-weight and requires minimal power suitable for battery operation in small sounding rockets and in high altitude aircraft for the accurate measurement of atmospheric density.

These and other advantageous objects will become apparent from the following specification and appended drawings.

This invention comprises generally the steps of directing a well-defined electron beam into a rarefied gaseous medium and measuring the X-ray radiation produced by interaction of the electron beam with the atoms in a selected volume of said medium. The measured parameter is the number of "bremsstrahlung" X-ray photons generated by said interaction, preferably those photons having energies of between 2 and 10 kev. so as to distinguish them from cosmic and solar radiation.

"Bremsstrahlung" is electromagnetic radiation which results from the deceleration of charged particles, e.g., electrons, as they pass the coulomb field of an atomic nucleus. The X-ray photon energy spectrum is continuous extending from a maximum energy limit equal to the kinetic energy of the incident electron on down to zero. The differential cross section $d\sigma$ for the emission of a photon in the energy range between E and $E+dE$ by incident electrons of kinetic energy T and total energy $T+m_0c^2$ ($m_0c^2$=energy of electron mass =511 kev.) can be written $$d\sigma = \sigma_0 B Z^2 \left(\frac{T+m_0C^2}{T}\right)\frac{dE}{E} \text{ cm.}^2/\text{atom}$$

This equation is discussed in the book by R. D. Evans "The Atomic Nucleus" (McGraw-Hill Book Co., 1955,

I claim:

1. A device for measuring gas density in a rarefied gaseous medium comprising a source of a well-defined electron beam, means for directing said beam into a rarefied gaseous medium and means for measuring the X-ray radiation produced in a selected volume of gas within said beam.

2. The device of claim 1 wherein means are provided to measure a small constant fraction of said beam and to compare it with said measured X-ray radiation.

3. The device of claim 1 wherein said X-ray measurement means includes a radiation counter.

4. A device for measuring gas density in a rarefied gaseous medium, comprising a source of a well-defined beam of electrons having energies in the range of approximately 3 to 5 kev., means for directing said beam into a rarefied gaseous medium and means for measuring the X-ray radiation produced in a selected volume of gas within said beam.

5. A device for measuring gas density in a rarefied gaseous medium, comprising a source of a well-defined beam of electrons having energies in the range of approximately 3 to 10 kev., means for directing said beam into a rarefied gaseous medium and means for measuring the X-ray radiation of approximately 2 to 10 kev. in energy produced in a selected volume of gas within said beam.

6. A device for measuring gas density in a rarefied gaseous medium, comprising a source of a well-defined electron beam, means for directing said beam into a rarefied gaseous medium, X-ray detecting means arranged so as to receive a well-defined beam of X-ray radiation which is directed from a segment of said electron beam within said medium, and means for measuring said received radiation.

7. A device for measuring gas density in a rarefied gaseous medium, comprising an electron gun whose beam is directed into such a medium and non-parallel X-ray measuring means directed into such medium so that its line of sight intersects said beam.

References Cited in the file of this patent

UNITED STATES PATENTS 2,316,239    Hare                  Apr. 13, 1943
2,952,776    Schumacher et al.       Sept. 13, 1960

OTHER REFERENCES

"Gaging Gas Density with Fast Charged Particles," by B. W. Schumacher from Nucleonics Magazine, volume 18, No. 10, October 1960, pages 106, 109, 110, 112 and 114.